Dec. 1, 1959   R. J. STEGEMEIER   2,914,947
TEMPERATURE RECORDER
Filed Dec. 11, 1956
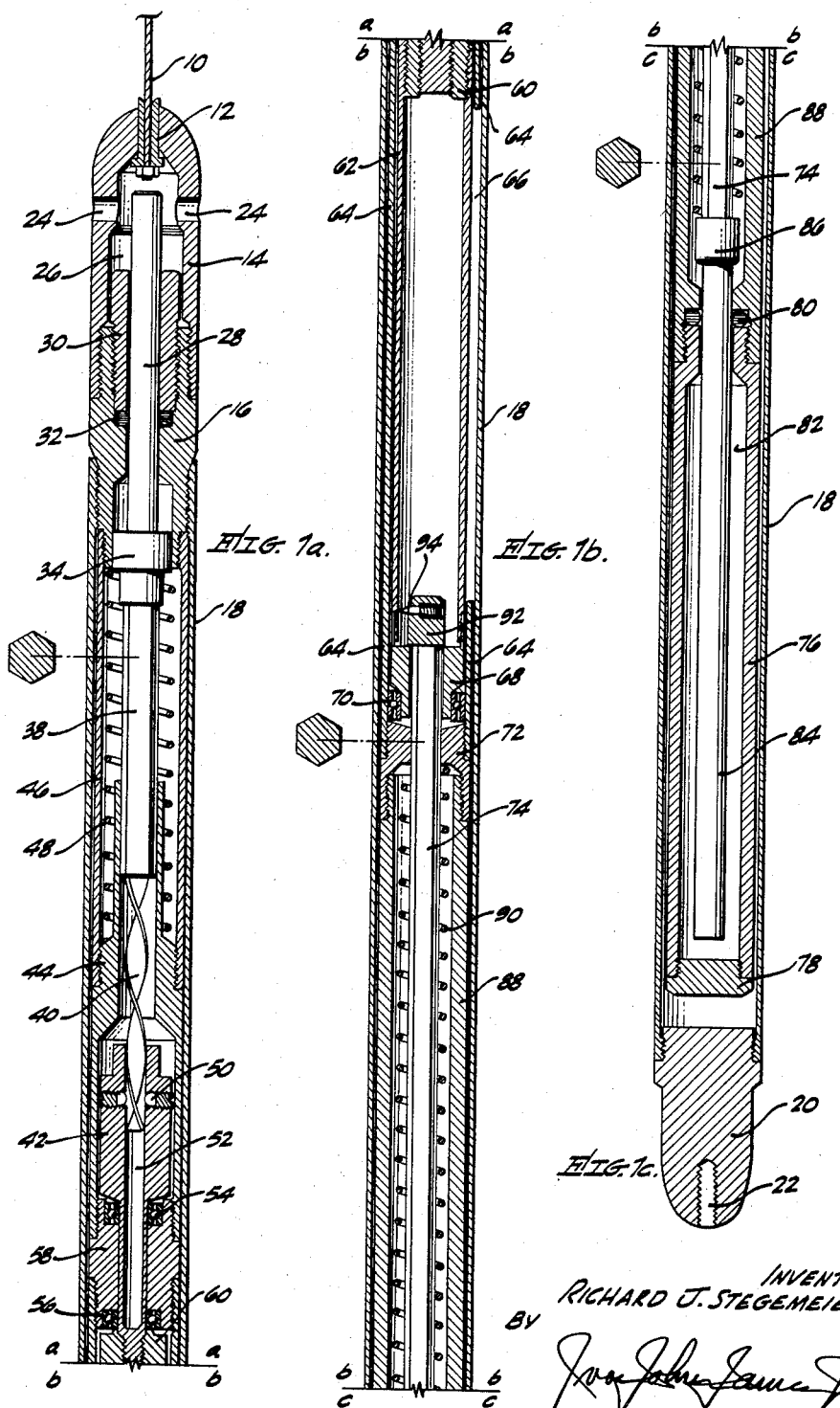
INVENTOR.
RICHARD J. STEGEMEIER,
BY
ATTORNEY.

United States Patent Office 2,914,947
Patented Dec. 1, 1959

2,914,947
TEMPERATURE RECORDER

Richard J. Stegemeier, Fullerton, Calif., assignor to Union Oil Company of California, Los Angeles, Calif., a corporation of California Application December 11, 1956, Serial No. 627,591

10 Claims. (Cl. 73—345)

This invention relates to temperature recorders and particularly to an improved apparatus for measuring and recording the temperatures of fluids existing in earth bores or vertical pipes as a function of position therein.

Temperature measurement and recording are extremely important in the operation of well bores into the earth which are used for the introduction or removal of fluids. In secondary recovery of petroleum, accurate temperature surveys of the fluid being injected as a function of depth in the well give an indication of the location and vertical extent of the permeable strata into which the fluid is flowing. In the production of petroleum from underground permeable strata, a similar temperature log indicates the position and thickness of permeable oil-bearing strata which produces oil into the bore. In cases of subterranean heating of oil wells to increase the flow by decreasing the oil viscosity and melting paraffin and asphalt plugs, a temperature log is indicative of the efficiency of the heating step. There are, of course, many other important applications for determining and recording temperature in elongated confined passageways such as pipes and earth bores and the like.

These temperature logs are run by passing a temperature sensitive instrument through the bore while taking readings and recording the temperature as a function of depth or of distance from some known reference point. In some cases it is possible to move the instrument through a well bore at a constant rate and to record the temperature on a moving chart driven by a clock mechanism. Later calculations readily correlate recorded temperatures with well depth.

As most of these logging instruments are of the order of 1.25 to 1.50 inches in outside diameter or more, there is a minimum limit of about 2.0 inches inside diameter to the size of bore or pipe in which these temperature surveys may be conducted when the recording is to be done inside the instrument. This precludes temperature measurements and recordings to be made in many pipes which are less than about two inches. One important application for such temperature surveys is in the case where a circulating heated fluid is employed to heat a selected portion of a well bore. In such instances a hot oil or other fluid is circulated from the surface to a bottom hole heater and back to the surface through relatively small diameter pipe such as ½ inch or ¾ inch nominal pipe size. The presently available temperature recording equipment is totally incapable of recording temperatures in these heater supply lines, principally because of the size of clock mechanisms required in conventional equipment to drive the recording chart.

The present invention relates to improved apparatus by means of which temperature recordings as a function of depth or distance in very small bores or pipes may be made in the ground or elsewhere. The invention is particularly suited to recording temperatures as a function of depth in well bores, particularly in bores or pipes having less than about 1.0 inch inside diameter.

It is a primary object of the present invention to provide an improved temperature recorder.

It is a further object to provide an improved apparatus adapted to the measurement and recording of temperature as a function of depth in well bores drilled into the earth.

It is a more specific object of this invention to provide a miniature temperature recorder based on novel operating principles which is capable of measuring and recording temperatures of ambient fluids while being passed through a bore or conduit having an inside diameter of less than 1.0 inch.

Other objects and advantages of the present invention will become more apparent to those skilled in the art as the description and illustration thereof proceed.

Briefly the present invention comprises a fluid-tight housing having an elongated tubular shape and which housing encloses a central recorder chart chamber, a fluid expansion chamber at one end, and a pressure chamber at the other end. In the central chamber a cylindrical chart holder is provided capable of supporting on its inner surface a removable cylindrical chart. The chart holder is suspended on bearings and turns freely. In the pressure chamber immediately adjacent is provided an elongated cylindrical pressure shaft. The pressure of the fluid whose temperature is to be measured acts through special openings provided in the outside shell or housing against a spring load and causes the pressure shaft to move along the longitudinal axis of the housing. At the end of the shaft is provided a slow helix with which is engaged a helix follower attached to the chart holder. As the pressure increases and the pressure shaft moves, the chart turns by an amount equivalent to the increase in pressure from the initial value. In an oil well which is full of drilling fluid, or in a vertical oil heating line in which the line is full of heat transfer fluid, the depth of the instrument in the line is directly determined from the pressure of the fluid at any particular point.

At the other end of the closed chamber is contained a second elongated or temperature shaft. In the surrounding chamber, a fluid having a relatively high temperature coefficient of expansion is provided into which the shaft extends. This chamber has a fluid-tight closure at one end and an expansion fluid seal around the shaft at the other. Increases in temperature cause the specific volume of the expansion fluid to increase forcing the shaft against another spring load in the other direction along the longitudinal axis of the instrument. This temperature expansion shaft is connected to a stylus shaft carrying at its extreme end a stylus within the cylindrical chart holder. As the temperature increases the stylus moves along the inner surface of the chart holder. Thus, in a temperature survey conducted in an oil well, increasing pressure of the well fluids with depth causes the chart to rotate while increasing temperatures of the fluids causes the stylus shaft to move through the chart holder thereby tracing the variation of temperature as a function of pressure or depth in the well. A permanent record is hereby attained.

The survey may be run in the well by passing the instrument very slowly through the bore and allowing the pressure and temperature effects to take place gradually. The survey may also be run by moving the recorder rapidly from station to station at spaced intervals through the well and allowing it to stand and come to a temperature equilibrium at each station before it is again moved to a new position. In any case, a curve representing the variation in temperature as a function of depth, when the conduit is filled with a fluid of known density, is obtained.

In the instrument described briefly above, of course it is possible to reverse the positions of the pressure chamber and the temperature or expansion chamber relative to the central chart holder chamber. It is possible also to cause the temperature effect to turn the chart while the pressure effect moves the stylus shaft longitudinally through the chart holder chamber. Other minor variations will be obvious.

The structure of one modification of the present invention and its operation will be more readily understood by reference to the accompanying drawing showing a vertical elevation view of the apparatus. Figures 1a, 1b, and 1c are broken views of the instrument in detailed cross section. Figure 1a is to be connected to the top of 1b, and Figure 1c is to be connected at the bottom of 1b forming a single elongated instrument.

The drawing described below is a typical example of the structure of this invention. The device shown in the drawing was 0.4375-inch outside diameter and was 14.813 inches in length. Exclusive of its supporting wire and any added bottom weight, the instrument weighed 6.7 ounces. The recorder was instrumental in providing temperature data in a bottom hole circulating hot oil heater located two thousand feet down an oil well and supplied with circulating oil by means of lines which were ¾-inch nominal pipe size.

Referring now more particularly to the drawing, suspension line 10 is connected through suspension ferrule 12 into outside top cap 14 in Figure 1a. The top cap is connected through top shell coupling 16 to the outside shell or housing 18 which is also shown in Figures 1b and 1c. In Figure 1c bottom cap and loading coupling 20 is attached to the bottom of housing 18 and is provided with a threaded opening 22 for the attachment of added weight if necessary to increase the weight of the instrument.

Referring now more particularly to Figure 1a, the outside top cap 14 is provided with several apertures 24 opening into pressure chamber 26. Disposed longitudinally within the upper part of the instrument is pressure shaft 28 which extends through pressure shaft bushing 30 and pressure seal 32 down to coupling 34. This coupling connects the cylindrical pressure shaft 28 with a lower hexagonal pressure shaft extension 38. The cross section of the extension shaft can, if desired, be any non-circular shape but hexagonal stock is readily available. At the lower extremity of extension 38 is provided helix 40 which extends downwardly into the chart holder rotating spindle 42. The hexagonal shaft extension 38 is extended through pressure shaft guide 44 which has a hexagonal opening. The shaft guide is integrally attached to pressure shaft housing 46 which in turn is attached at its upper end to the top seal coupling 16. In this way the pressure shaft guide 44 is prevented from rotation and fluid pressures acting on the top of pressure shaft 28 cause the pressure shaft and its extension 38 to move downwardly through the shaft guide 44 without turning. Pressure shaft loading spring 48 is provided which tends to bias the pressure shaft upwardly in the drawing shown. Seal 32 prevents ambient fluids from entering the housing but still permits the longitudinal motion of pressure shaft 28, hexagonal extension 38, and drive helix 40.

In the lower portion of Figure 1a, the chart housing rotating spindle 42 is shown provided with a spring loaded ball follower 50. The spindle is further provided with central channel 52 into which drive helix 40 extends when the pressure shaft is depressed. The rotating spindle is provided with upper bearings 54 and lower bearings 56 mounted in spindle bearing holder 58. The lower end of spindle 42 is integrally attached by means of a spindle nut 60 to chart holder cylinder 62, shown at the top of Figure 1b.

In Figure 1b the outside shell or housing 18 is shown surrounding chart holder housing 64 which is provided with an aperture or access opening 66. The purpose of this is to enable the operator to check the freedom of rotation of the chart holder cylinder 62 prior to assembling the instrument for use. At about the midpoint in Figure 1b is shown chart holder cylindrical bottom bearing holder 68 and bottom bearing 70. The bearings are held in position against the upper surface of stylus shaft guide 72 which has a hexagonal opening through the center thereof and through which the hexagonal stylus shaft 74 extends.

Because of the construction briefly described above, the chart holder cylinder 62 is turned by means of rotating spindle 42 as the pressure shaft, previously described, moves longitudinally within the instrument.

Referring now to Figure 1c, outside shell or housing 18 is shown with bottom cap 20 and containing an expansion fluid well 76. This well is closed by means of well closure 78 and is provided at its upper end with an expansion fluid seal 80. Expansion fluid chamber 82 is thus formed which is filled with a fluid having a relatively high temperature coefficient of expansion. Temperature effects acting on the fluid cause the fluid to expand and the resulting increase in fluid volume causes temperature shaft 84 to move upwardly through expansion fluid seal 80. The temperature shaft is connected by means of coupling 86 to the hexagonal stylus shaft 74 previously referred to in Figure 1b. The cross section of the stylus shaft may be any noncircular shape. The stylus shaft extends through stylus shaft housing 88 which is also shown at the bottom of Figure 1b. The stylus shaft loading spring 90 extends between shaft coupling 86 in Figure 1c and stylus shaft guide 72 in Figure 1b. It tends to bias the temperature shaft 84 downwardly into the well 76.

At the upper end of the hexagonal stylus shaft 74 at about the central point in Figure 1b is disposed stylus holder 92. Extending radially from the stylus holder is stylus 94 provided with a suitable scribe point which extends against the inner surface of the chart, not shown, but which is rolled around the inside surface in the form of a cylinder in chart holder cylinder 62.

In operation the instrument is assembled in the manner shown. A chart which may consist of a blackened strip of very thin brass or copper such as shim stock is placed within the chart holder cylinder. The expansion fluid well is filled with a liquid such as Dowtherm. The instrument is suspended by means of suspension line 10 and passed downwardly or upwardly through a vertical conduit filled with fluid of a known density and whose temperature is to be determined and recorded.

As the instrument is lowered into the fluid, the fluid hydrostatic pressure acting through openings 24 against the upper end of pressure shaft 28 causes that shaft and its hexagonal extension 38 to move downwardly against loading spring 48. This depresses the slow helix drive 40 farther into chart rotating spindle 42. The spindle thereby turns by means of the ball followers 50 and turns chart holder cylinder 62 through an arc of rotation equivalent to the increase in pressure or the increase in depth. Simultaneous increases in temperature cause the Dowtherm or other fluid in expansion fluid well chamber 82 to move the temperature shaft upwardly and by means of its connection through the hexagonal stylus shaft 74, stylus 94 is moved upwardly through the chart holder cylinder, thereby marking the chart to record the temperature. Because the stylus moves upwardly as a function of temperature and because the chart holder turns as a function of pressure or depth, the stylus marks the chart automatically to indicate the variation in temperature of fluids surrounding the instrument as a function of the pressure or depth in the conduit.

It is possible to move the instrument of this invention slowly through a vertical conduit so that the temperature of the expansion fluid is at equilibrium and substantially equal to the temperature of the ambient fluids at all times. In this case, the position of the stylus at all times indicates and records the temperature of the ambient fluid. The pressure response is substantially instantaneous and a pressure temperature curve is obtained on the recording chart.

In instances where greater speed is desirable, the chart is moved through the conduit in a series of steps. The chart holder turns as the instrument is changed in depth immediately indicating and recording the new pressure. At each desired station the instrument is suspended in a stationary position for a time sufficient to bring the expansion fluid into equilibrium with the ambient fluids. This equilibrium is attained relatively slowly compared to the rate of pressure or depth equilibrium. Accordingly the trace made on the chart is a discontinuous curve, the points of which represent equilibrium conditions of temperature and pressure. A curve drawn through these points represents the actual variation of fluid temperature in the well bore or other conduit with depth or pressure therein.

In any event the instrument is calibrated prior to use so that the rotational deflections of the chart holder cylinder and the longitudinal deflections of the stylus as functions of the two variables of pressure and temperature are known.

Suitable fluids for use in the expansion fluid will include Dowtherm or diphenyl or diphenyl oxide, or mixtures thereof, mercury, silicones, and many hydrocarbons. These are not intended to be exclusive as any liquid with a substantial specific volume change with temperature may be selected.

Materials of construction of the instrument are not critical except that the external shell or housing, the top shell coupling, the outside top cap, the pressure shaft bushing, and the pressure shaft should be constructed of materials such as stainless steel, monel, and other alloys which are resistant to the corrosive action of most fluids commonly used or encountered in well bores.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. An apparatus for recording temperatures in elongated conduits of relatively small cross section which comprises an elongated housing at one end enclosing a pressure chamber having an opening through said housing, at the other end enclosing a closed fluid expansion chamber filled with fluid and between said chambers enclosing a chart holder chamber; a pressure shaft extending from said pressure chamber longitudinally toward said chart holder chamber; a temperature shaft extending from said expansion chamber longitudinally toward said chart holder chamber; a rotatable chart holder cylinder disposed within said chart holder chamber; a cylindrical recording chart disposed within said chart holder cylinder; a chart marking stylus attached at the end of one of said shafts within said chart holder cylinder; a slow helix attached to the other of said shafts and extending longitudinally toward said chart holder cylinder; and a helix follower attached to said chart holder cylinder and in engagement with said helix, whereby longitudinal movement of said helix causes said chart holder cylinder to rotate.

2. An apparatus according to claim 1 wherein said stylus is attached at the end of said temperature shaft, and said helix is attached to said pressure shaft.

3. An apparatus according to claim 1 wherein said pressure chamber is disposed at the upper end and said expansion chamber is disposed at the lower end of said housing as said apparatus is used in a vertical conduit.

4. An apparatus for recording temperatures as a function of ambient pressure in elongated conduits which comprises an elongated fluid-tight housing, a chart holder cylinder disposed at a position intermediate the ends of said housing, a cylindrical recording chart disposed around the inner surface of said cylinder, a spring loaded ball follower attached at the upper end of said chart holder cylinder, a perforated outside top cap attached at the top of said fluid-tight housing forming a pressure chamber, a pressure shaft extending longitudinally downwardly from said chamber through a shaft seal into said housing a pressure shaft guide of noncircular cross section, a pressure shaft extension of noncircular cross section extending through said guide to permit only longitudinal movement of said pressure shaft and extension, a slow helix extending longitudinally from said pressure shaft extension into engagement with said follower, whereby longitudinal movement of said pressure shaft induces rotation of said chart holder cylinder, an expansion fluid well disposed at the bottom of said housing, a body of fluid disposed in said well, a temperature shaft extending from said well longitudinally upwardly through a shaft seal, a stylus shaft guide of noncircular cross section disposed below said chart holder cylinder, a stylus shaft of noncircular cross section connected to said temperature shaft and extending longitudinally upward into said chart holder cylinder through said stylus shaft guide to permit only longitudinal motion of said stylus shaft, a stylus holder at the end of said stylus shaft, and a stylus radially extending therefrom into contact with said recording chart.

5. An apparatus according to claim 4 in combination with a pressure shaft loading spring surrounding said pressure shaft extension and biasing said pressure shaft upwardly against the action of pressure on said shaft, and a stylus shaft loading spring surrounding said stylus shaft and biasing said stylus holder downwardly against the action of the expansion fluid.

6. An apparatus according to claim 4 wherein said expansion fluid comprises a hydrocarbon liquid.

7. An apparatus according to claim 4 wherein said pressure extension shaft and said stylus shaft are hexagonal in cross section.

8. An apparatus according to claim 4 in combination with a top shell coupling connecting said outside top cap to the top of said elongated housing, a bottom cap and loading coupling closing the bottom of said elongated housing; and within said elongated housing the combination of a pressure shaft housing surrounding said pressure shaft extension and extending from said top shell coupling to said pressure shaft guide, a spindle bearing holder attached to the bottom of said pressure shaft guide, a chart rotating spindle connecting said ball follower to said chart holder cylinder, spindle bearings between said spindle and said bearing holder, a chart holder housing surrounding said chart holder cylinder and having an access opening in the side thereof and extending from said spindle bearing holder to said stylus shaft guide, and a stylus shaft housing surrounding said stylus shaft and extending from said stylus shaft guide to the top of said expansion fluid well.

9. An apparatus according to claim 4 in combination with means at the upper end of said fluid-tight elongated housing for attaching a suspension line.

10. An apparatus according to claim 4 in combination with a chart holder cylinder bottom bearing holder attached to the bottom of said chart holder cylinder, and a chart holder bottom bearing disposed between said bearing holder and said stylus shaft guide.

References Cited in the file of this patent

UNITED STATES PATENTS 2,015,851   Herrick et al. _____ Oct. 1, 1935